United States Patent [19]

Kakiuchi et al.

[11] Patent Number: 5,916,477

[45] Date of Patent: Jun. 29, 1999

[54] HEAT STORAGE/HEAT RADIATION METHOD

[75] Inventors: Hiroyuki Kakiuchi; Masanori Yamazaki; Shoichi Chihara; Yasuhiro Terunuma; Yuichi Sakata, all of Ibaraki, Japan

[73] Assignee: Mitsubishi Chemical Corporation, Tokyo, Japan

[21] Appl. No.: 08/958,585

[22] Filed: Oct. 28, 1997

[30] Foreign Application Priority Data

Oct. 29, 1996 [JP] Japan .................................. 8-286578

[51] Int. Cl.⁶ ...................................................... C09K 5/00
[52] U.S. Cl. ................................ 252/70; 252/73; 252/77; 165/104.11
[58] Field of Search ................................. 252/70, 73, 77; 165/104.11

[56] References Cited

U.S. PATENT DOCUMENTS

| | | | |
|---|---|---|---|
| 4,295,517 | 10/1981 | Guex et al. | 165/53 |
| 4,572,864 | 2/1986 | Benson et al. | 252/70 |
| 4,795,580 | 1/1989 | Hormansdorfer | 252/70 |
| 5,785,885 | 7/1998 | Kakiuchi et al. | 252/70 |

FOREIGN PATENT DOCUMENTS

| | | |
|---|---|---|
| 0 722 997 | 7/1996 | European Pat. Off. . |
| 51-70193 | 6/1976 | Japan . |
| 51-128053 | 11/1976 | Japan . |
| 57-145173 | 9/1982 | Japan . |
| 5-32963 | 2/1993 | Japan . |

OTHER PUBLICATIONS

Chemical Abstract No. 121:182784, abstract of Japanese Patent Specification No. 06–158032, Jun. 1994.
WPIDS Abstract No. 84–227728, abstract of Japanese Patent Specification No. 59–134497, Aug. 1984.
WPIDS Abstract No. 87–093775, abstract of PCT International Application No. WO 87/01716, Mar. 1987.
WPIDS Abstract No. 93–088887, abstract of Japanese Patent Specification No. 05–032963, Feb. 1993.
WPIDS Abstract No. 93–221296, abstract of Japanese Patent Specification No. 05–093186, Apr. 1993.
WPIDS Abstract No. 96–335466, abstract of European Patent Specification No. 722997, Jul. 1996.

*Primary Examiner*—Anthony Green
*Attorney, Agent, or Firm*—Oblon, Spivak, McClelland, Maier & Neustadt, P.C.

[57] ABSTRACT

Heat storage/heat radiation is effected by a method comprising conducting heat storage/heat radiation in an apparatus containing a heat storage material of a sugar alcohol in an oxygen depleted atmosphere. The latent heat storage material does not suffer from any charge either in melting point or in the heat storage capacity even after repeated use.

15 Claims, 4 Drawing Sheets

HEAT STORAGE/HEAT RADIATION METHOD

BACKGROUND OF THE INVENTION

1. Field of the Invention

The present invention relates to a heat storage/heat radiation technique using the latent heat of fusion of a heat storage material containing a sugar alcohol.

2. Description of the Background

Latent heat storage materials are superior to sensible heat storage materials with respect to higher heat storage density and constant phase change temperature. Because of these characteristics, latent heat storage materials, from which heat can be removed at a stable temperature, have been employed in practice. Known examples of these latent heat storage materials include ice/sodium sulfate decahydrate, calcium chloride hexahydrate, sodium formate trihydrate, magnesium chloride hexahydrate and sodium acetate trihydrate (JP-A-51-128053, JP-A-51-70193 and JP-A-57-145173; the term "JP-A" as used herein means an "unexamined published Japanese patent application"). However, these latent heat storage materials have relatively low phase change temperatures, i.e., 50° C. or below. Thus, they are unsuitable as heat storage materials in the applications of the utilization of waste heat from hot water supply or boilers or solar energy where high phase change temperatures (90 to 190° C.) are needed.

Under these circumstances, it has been proposed to use heat storage materials having high phase change temperatures which contain sugar alcohols such as erythritol, mannitol, galactitol, and the like, as the main component together with pentaerythritol, silicic acid compounds, and the like (JP-A-5-32963, JP-A-63-500946, JP-A-8-245953 and U.S. Pat. No. 4,295,517; the term "JP-B" as used herein means an "examined Japanese patent publication"). Of all of these sugars, erythritol is expected to be highly useful as a heat storage material, since it has a high melting point of about 120° C. and an extremely large latent heat of fusion of about 87 cal/g, it exhibits no corrosive action on metals and is safe to human body. However, it has been found out that when a sugar alcohol is subjected to repeated heat storage/heat radiation, its melting point gradually lowers and the heat of fusion thereof also reduces.

When a heat storage material containing a sugar alcohol, as the main component, is used as a latent heat storage material, the heat storage material is melted by heating to 150 to 180° C. and then the heat is stored. In the step of melting by heating, a sugar alcohol, in particular, erythritol is partly oxidized to an oxide. This oxide then serves as a catalyst and promotes the decomposition of erythritol and the formation of erythritan. The present inventors have found out that when erythritol contains erythritan, the melting point of a heat storage composition is lowered and the heat of fusion is reduced.

SUMMARY OF THE INVENTION

Accordingly, one object of the present invention is to provide a heat storage/heat radiation wherein a sugar alcohol, employed as a latent heat storage material, does not suffer any change either in melting point or in heat storage capacity, even after repeated use.

Briefly, this object and other objects of the present invention as hereinafter will become more readily apparent can be attained by a method of effecting heat storage/heat radiation which comprises conducting heat storage/heat radiation in an apparatus containing a heat storage material of a sugar alcohol in an oxygen depleted atmosphere.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like of corresponding parts throughout and wherein.

DETAILED DESCRIPTION OF THE PREFERRED EMBODIMENTS

Figure 1:
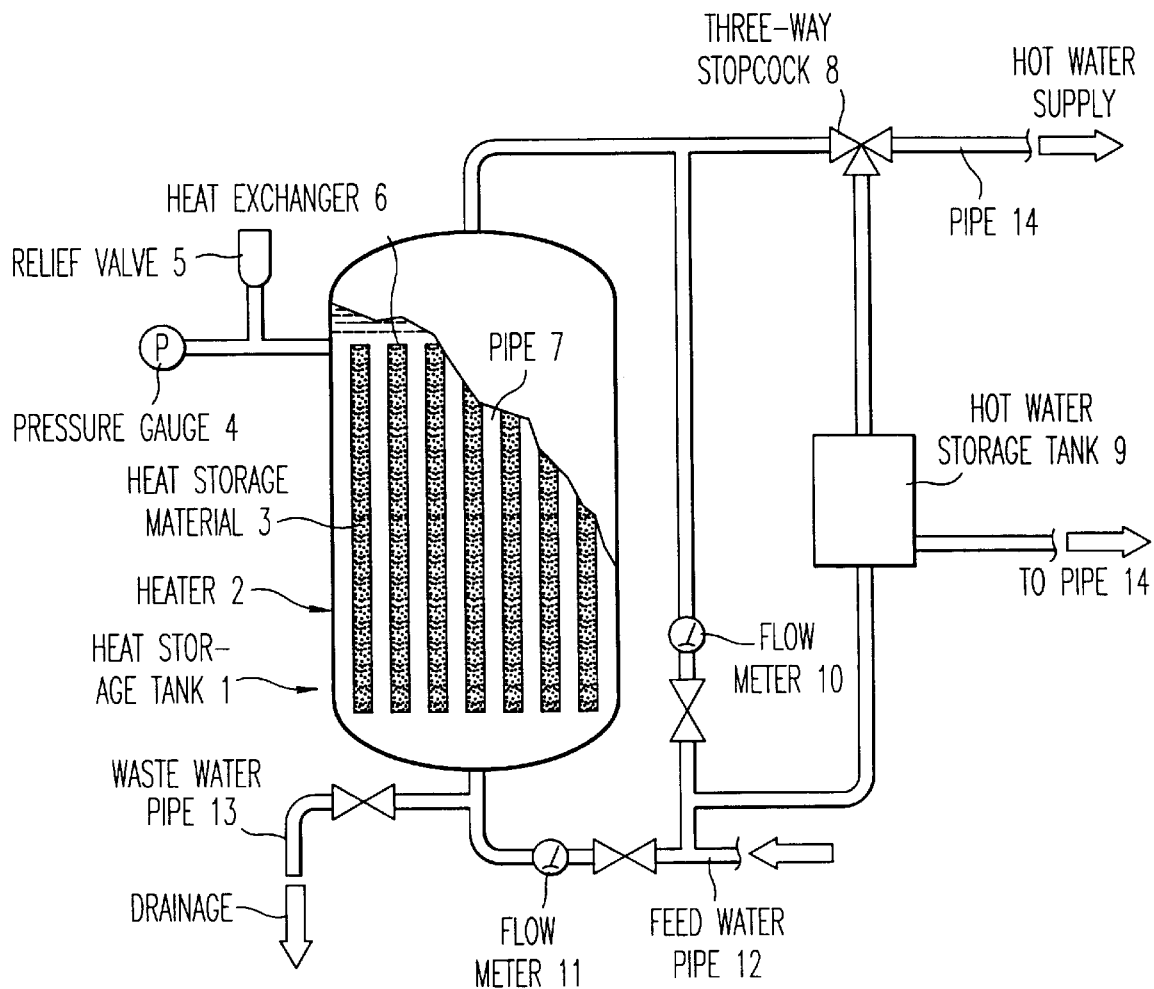
FIG. 1 is a schematic view of an electric water heating appliance to which the present invention is applicable.

The term "an oxygen-limited atmosphere" as used herein means an atmosphere having a lowered oxygen content than the usual level, i.e., an oxygen content in the atmosphere of about 20% by volume. The oxygen content in this atmosphere is usually not more than 10%, preferably not more than 5% and still preferably not more than 1%. The most desired atmosphere is a substantially oxygen-free atmosphere.

The most common practice is to use a latent heat storage material in a heat storage container by filling the likes of as a capsule. Such a capsule is made of a material which is chemically stable to the sugar alcohol to be used as the heat storage material within the working temperature range and has gas barrier properties against oxygen. The mechanical strength of the capsule should be such that it does not seriously deform and its heat resistance should be such that it does not fuse within the working temperature range. In particular, use can be made therefore of metals such as stainless steel, aluminum, iron and tinplate; inorganic materials such as glass and alumina and engineering plastics such as polyamide, polyester and polycarbonate.

The shape of the capsule is not particularly limited but can be appropriately selected depending on the purpose of use. For example, the capsule may be in the form of a sphere, a flat plate, a pipe, a compressed cylinder, a twin sphere or a wavy plate. It is important in this step to use a heat storage container which can be sealed (hereinafter referred to simply as a "sealable container"). After filling a container with the heat storage material, the sealable container is purged with an inert gas such as nitrogen or argon, and sealed. Thus an oxygen-free state can be maintained therein. Alternatively, an oxygen-free state can be established by filling the container with the heat storage material in the sealable container, evacuating the container and then sealing. A substantially oxygen-free state can be also established by feeding an appropriate amount of a commonly marketed oxygen scavenger into the container followed by sealing. In this step, the heat storage container may be provided with a pressure reducing valve, etc. so as to prevent an increase in internal pressure.

Regarding the extent to which oxygen is limited, it is not always necessary to achieve an oxygen-free state. When a sealable container is used, for example, it is preferred that the molar ratio of oxygen/sugar alcohol in the container is not more than $5 \times 10^{-4}$, still preferably not more than $1 \times 10^{-5}$. Such a molar ratio can be established by, for example, elevating the filling ratio of the heat storage material or reducing the oxygen concentration in the space in the container. More concretely, the molar ratio as specified above can be established by regulating the filling ratio of the heat storage material in the container to 60% by volume or above, preferably 70% by volume or above, when the space in the completely sealed container is filled with air containing oxygen at the usual concentration.

It is advantageous from the viewpoint of maintenance of heat storage apparatus to use an opened type sealable container and seal it with an oxygen barrier sheet, or the like. Such a sealing method has another benefit, which is that the problem of the smell of erythritol can be avoided.

The heat storage material may be used in the form of microcapsules. These microcapsules are composed of fine particles of the heat storage material or an aggregate thereof coated with a resin or the like, which neither melts nor deteriorates within the working temperature range. It is difficult in this case to purge microcapsules with an inert gas during production. It is effective to use an oxygen scavenger together with the heat storage material.

Examples of the oxygen scavenger include iron oxide, vitamin C and hexacarbonyl iron. The oxygen scavenger is employed at a ratio of from 0.01 to 10 parts by weight per 100 parts by weight of the sugar alcohol.

In a heat storage system, the heating medium is passed around the capsules or microcapsules and the resin coating of the capsules or microcapsules serves as a heat exchanger, thus enabling heat storage and heat radiation. As the heating medium, use can be made of water, water vapor, gas such as air, or the like.

The heat storage material to be used in the present invention contains a sugar alcohol as the main component. As the sugar alcohol, erythritol, mannitol, galactitol, or the like is usually employed either alone or in combination. Erythritol is the preferred sugar alcohol.

The heat storage material containing a sugar alcohol as the main component may be used together with known heat storage materials, for example, organic materials such as paraffins, polyethylene glycol, polyvinyl alcohol, polyethylene, crosslinked polyethylene or glycerol. When other heat storage material(s) are used, content preferably should not be more than 50% of the heat storage composition.

The sugar alcohol based heat storage material of the present invention should further contains a salt which is barely soluble in water, or the like as a supercooling inhibitor. Examples of the barely water-soluble salt include inorganic salts and organic salts. Suitable examples of the inorganic salts include phosphates, sulfates, pyrophosphates, carbonates, calcium salts of inorganic acids, aluminum salts of inorganic acids, silver salts of inorganic acids and silver halides. More particularly, use can be made of calcium tertiary phosphate ($Ca_3(PO_4)_2$), calcium sulfate, calcium pyrophosphate ($Ca_2P_2O_7$), calcium carbonate, calcium fluoride, aluminum phosphate, silver iodide, silver phosphate, silver bromide, silver sulfate, and the like. Of these salts, particularly preferred are calcium tertiary phosphate, calcium sulfate, aluminum phosphate, silver iodide, silver phosphate, silver bromide, and the like, since these salts have the remarkable effects of inhibiting supercooling and stable crystallization temperatures even upon repeated melting and crystallization.

Suitable examples of the organic salts include polyvalent metal salts of long-chain fatty acids having usually at least 16 carbon atoms, preferably from 16 to 22 carbon atoms. Examples thereof include palmitates, stearates and behenates. Calcium palmitate, calcium stearate, magnesium stearate, barium stearate, calcium behenate, and the like are particularly preferred.

The heat storage material to be used in the present invention may further contain additives such as, for example, thickeners such as water-insoluble adsorbent resins, carboxymethylcellulose, sodium alginate, potassium alginate and pulverized silica; antioxidants such as phenols, amines and hydroxyamines; metal corrosion inhibitors such as chromates, polyphosphates and sodium nitrite; and commercially available oxygen scavengers.

The heat stability of the heat storage material can be further improved by adding thereto a heterocyclic compound having nitrogen content of from 0.005 to 10 parts by weight, preferably from 0.05 to 3 parts by weight, per 100 parts by weight of the sugar alcohol contained therein. These heterocyclic compound containing nitrogen atoms are believed to trap the acid substance seemingly acting as the catalyst in the formation of erythritan, since it shows a basicity because of the unpaired electron(s) on the nitrogen atom(s). Suitable examples of the heterocyclic compound containing nitrogen atom(s) include compounds having a pyrrole ring, those having a pyridine ring, those having a diazole ring such as a pyrazole or imidazole ring, those having a diazine ring (6-membered ring) such as a pyridazine, pyrimidine or pyrazine ring, and those having a thiazole ring, and derivatives thereof.

Of the heterocyclic compounds, those having an imidazole ring and derivatives thereof are most preferred from the viewpoint of the reactivity between erythritan and the acidic substance thus formed.

Suitable examples of the compounds having an imidazole ring and derivatives thereof include 1-methylimidazole, 4-methylimidazole, 1,2-dimethylimidazoline, 1-ethyl-2-methylimidazoline, 2,4-dimethylimidazoline, 2-methylimidazole, 2-methylimidazoline, 2-ethyl-4-methylimidazole, 2-laurylimidazole, 2-stearylimidazole, 2-phenylimidazole, 2-phenylimidazoline, 2-phenyl-4-methylimidazole, 1-benzyl-2-methylimidazole, bis(2-ethyl-4-methylimidazole), 1-methyl-2-ethyl-imidazole, 1-benzyl-2-ethylimidazole, 1-benzyl-2-phenylimidazole, 2-methyl-4-(2',4'-diamino-S-triazinyl-6')imidazole, 2-(2'-methylimidazolin-4')benzimidazole, 2-(2'-phenylimidazolyl-4')benzimidazole, 2-alkylimidazole/formaldehyde condensate, 2-phenylimidazole/formaldehyde condensate, 2,4-diamino-6-(2-methylimidazolyl-(1))-ethyl-S-triazine, 2,4-diamino-6-(2-ethyl-4-methylimidazolyl-(1))-ethyl-S-triazine, 2,4-diamino-6-(undecylimidazolyl-(1))-ethyl-S-triazine, 2-phenyl-4,5-dihydroxymethylimidazole, 2-phenyl-4-methyl-5-hydroxymethylimidazole, 1-cyanoethyl-2-phenyl-4,5-di(cyanoethoxymethyl) imidazole, 1-cyanoethyl-2-methylimidazole, 1-cyanoethyl-2-ethyl-4-methylimidazole and 1-cyanoethyl-2-undecylimidazole.

Table 1 shows the physical data of typical heterocyclic compounds having nitrogen atom(s) for reference.

TABLE 1

| Compound | M.p. (° C.) | B.p. (° C.) | Solubility (g/100 g $H_2O$) | pKb |
|---|---|---|---|---|
| pyrrole | — | 130 | (barely soluble) | 13.6 |
| imidazole | 90 | 257 | highly soluble | 7 |
| pyridine | −42 | 115 | soluble | 8.6 |
| piperidine | −7 | 106 | soluble | 2.8 |

The present heat storage material may be prepared by any acceptable method. The heat storage material may be prepared by mixing and uniformly dispersing a sugar alcohol optionally together with a heterocyclic compound having nitrogen atom(s), a barely soluble salt, additive(s) and known heat storage material(s). A more uniform dispersion can be obtained by heating the sugar alcohol to its melting point or above and adding the barely soluble salt and additive(s) thereto with stirring.

Reference is hereby made to the electric water heating appliance shown diagrammatically to FIG. 1.

In FIG. 1, 1 is a heat storage tank; 2 is a heater; 3 is a heat storage material; 4 is a pressure gauge; 5 is a relief valve; 6 is a heat exchanger; 7 is a pipe; 8 is a three-way stopcock; 9 is a hot water storage tank; 10 and 11 each is a flow meter; 12 is a feed water pipe; and 13 is a waste water pipe.

The heat storage tank 1 contains heat storage material 3 together with heat exchanger 6 which facilitates heat exchange between a heating means, such as heater 2, and water. The pressure gauge 4 and the relief valve 5 are provided to relieve any rapid increase in the pressure within the heat storage tank due to the reduced space therein.

In the step of heat storage, the heat storage material in the heat storage tank is heated by the heating means such as heater 2 to a temperature of, for example, 90 to 190° C., which melts the sugar alcohol (heat storage). In this step, it is preferred, from the viewpoint of the efficient utilization of energy, that when the sugar alcohol is completely melted, the heating means is switched off by, for example, a temperature sensor (not shown).

In the step of heat radiation, water is supplied through the pipe 12 and heated via the heat-exchange with the heat storage material in the heat storage state in heat storage tank 1. Next, hot water is directly supplied or stored in hot water storage tank 9. Then the hot water is supplied from the hot water storage tank 9 or the heat storage tank 1 through the three-way stopcock 8 and the pipe 14, when needed. The sugar alcohol in the heat storage material in the heat storage tank is successively subjected to heat radiation through the heat-exchange with water and thus solidified.

According to the present invention, heat storage and heat radiation can be repeatedly performed and heat energy can be thus efficiently utilized.

Having now generally described the invention, a further understanding can be obtained by reference to certain specific examples which are provided herein for purposes of illustration only and are not intended to be limiting unless otherwise specified.

EXAMPLE 1

Figure 2:
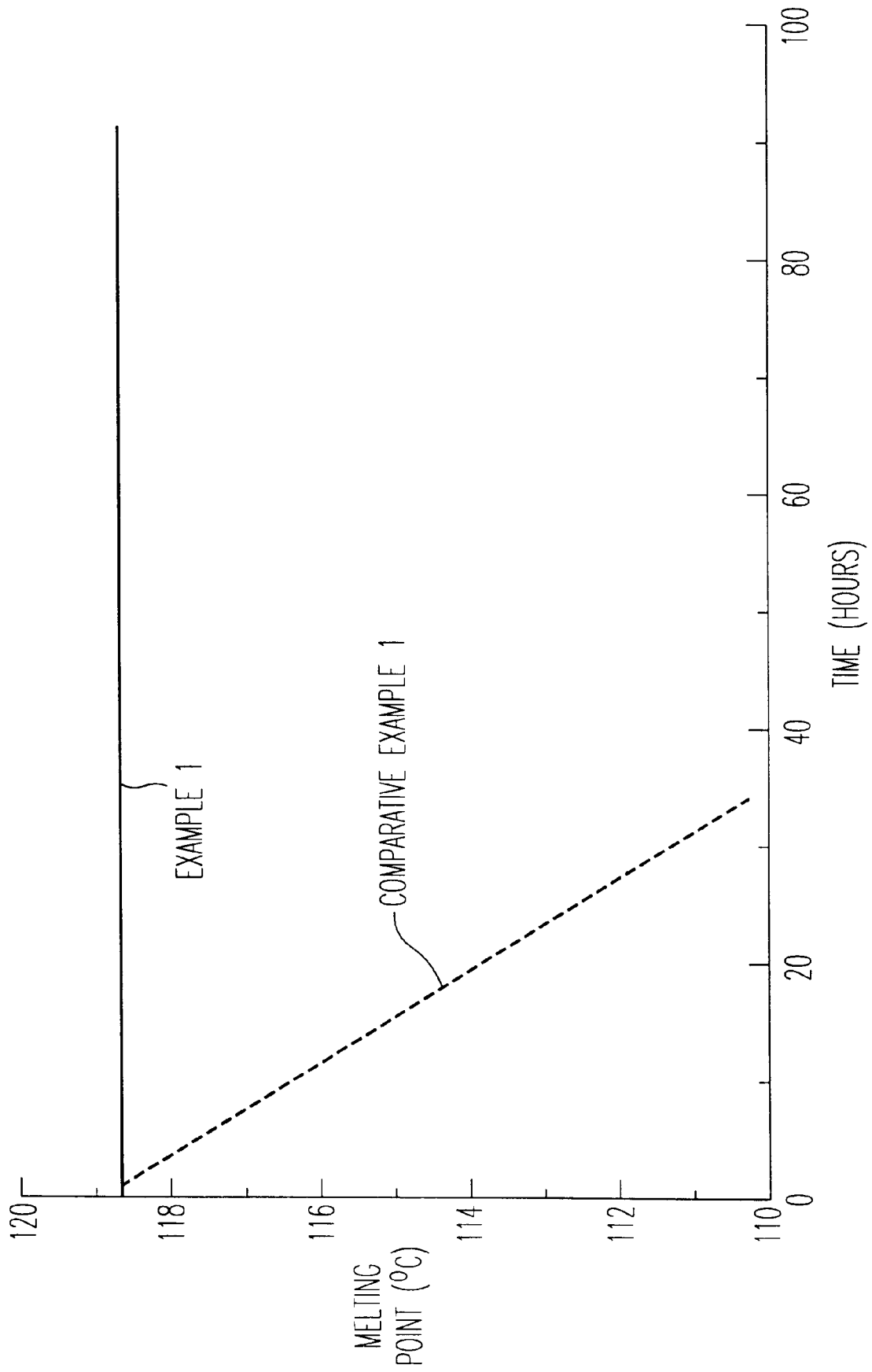
FIG. 2 is a graph of thermal history which shows changes, with the passage of time, of the melting points of the heat storage materials of Example 1 of the present invention and Comparative Example 1.
Figure 3:
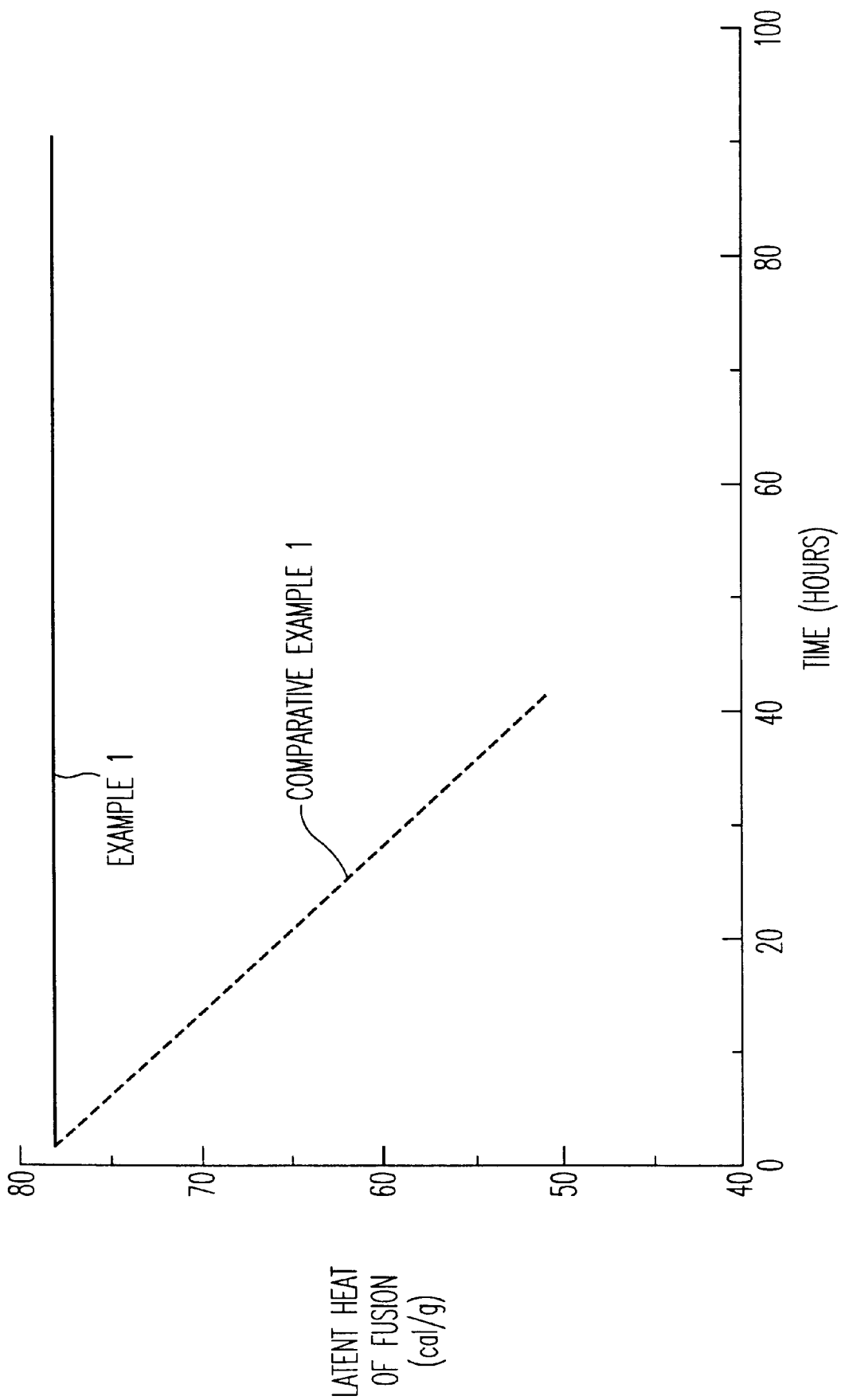
FIG. 3 is a graph of thermal history which shows changes, with the passage of time, in the latent heat of fusion of the heat storage materials of Example 1 of the present invention and Comparative Example 1.

An 80 g amount of erythritol (manufactured by Mitsubishi-Kagaku Foods Corporation) was introduced into a 300 ml round-bottomed flask and then heated in an oil bath to 190° C. at a rate of 5° C./min while passing a nitrogen gas ($N_2$: 99.999% or more, $O_2$: not more than 0.5 ppm, dew point: not higher than −70° C.) through the flask at a flow rate of 300 ml/min. Then the erythritol was maintained at 190° C. and sampled at definite points. Each sample was heated in a differential scanning calorimeter (DSC) first to 130° C. at a rate of 10° C./min. Next, it was cooled to −30° C. at a rate of 5° C./min and then heated again to 130° C. at a rate of 10° C./min. The melting point (the temperature at which the sample started to melt) and the latent heat of fusion were measured. The melting point data are shown by the solid line in FIG. 2, while the latent heat of fusion data are shown by the solid line in FIG. 3. Three samples were taken up each time. The melting point data and the latent heat of fusion data are shown in FIGS. 2 and 3 and are each the average of these samples.

It was found out that erythritol underwent no deterioration even after heating at 190° C. for 90 hours in the present method.

COMPARATIVE EXAMPLE 1

The procedure of Example 1 was repeated but no nitrogen was passed through the flask but, rather an open reaction system was employed. Samples were removed at definite points and the melting points and the latent heats of fusion were measured. The data thus obtained are shown in FIGS. 2 and 3 each in a broken line.

As FIGS. 2 and 3 show, the melting point was lowered to about 110° C. and the latent heat of fusion was reduced to about 60 cal/g (251 J/g) after effecting the experiment in the presence of oxygen for 30 hours.

EXAMPLE 2

Figure 4:
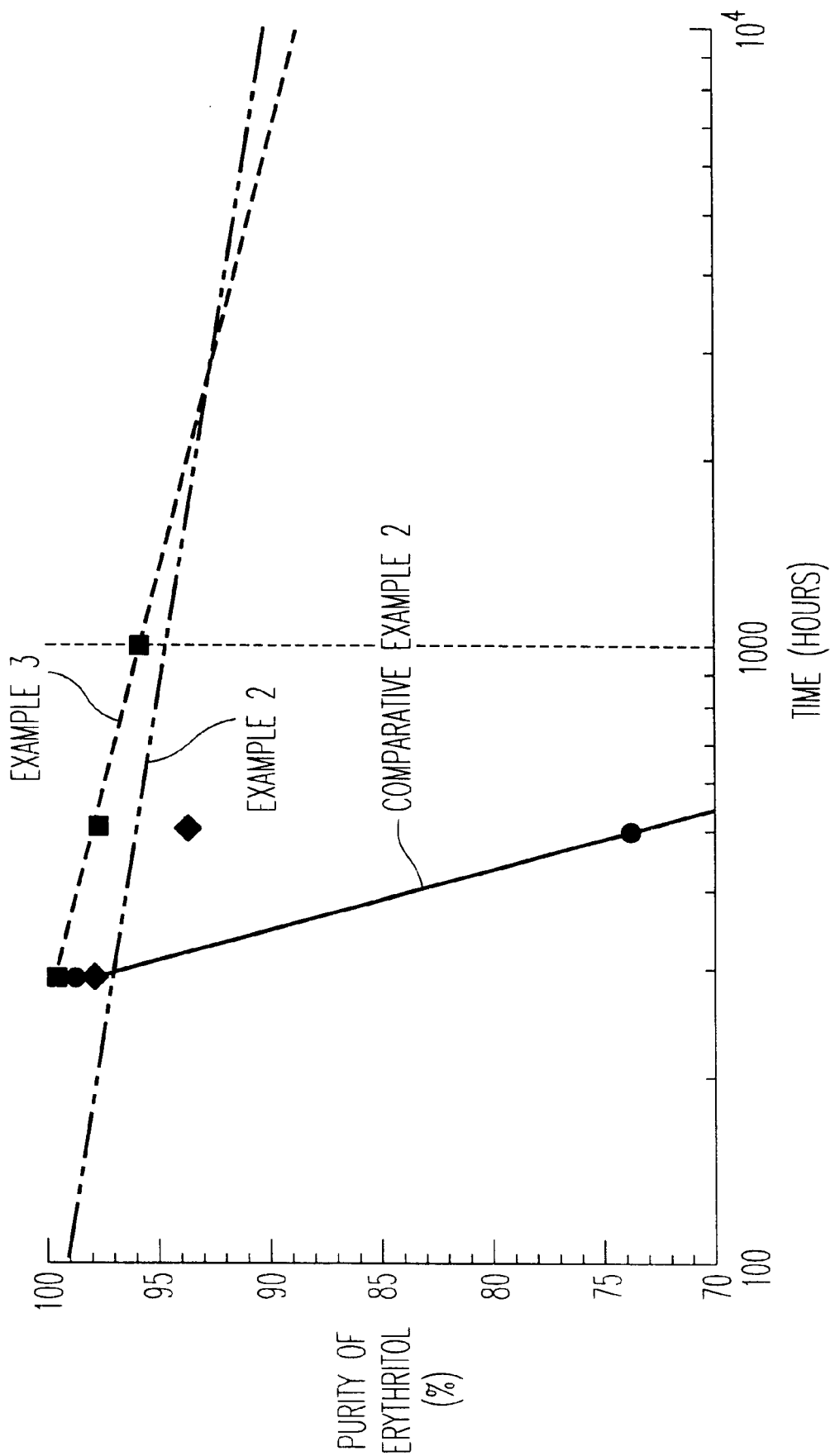
FIG. 4 is a graph which shows changes, with the passage of time, in the purity of erythritol in Examples 2 and 3 of the present invention and Comparative Example 2.

A 14.3 g amount of erythritol (manufactured by Mitsubishi-Kagaku Foods Corporation) was introduced into a 14 ml stainless container and sealed (molar ratio of $O_2$/erythritol=$3.3\times10^{-4}$). Samples of a definite number were prepared under the same conditions and introduced into an oven at a constant temperature (180° C.). The samples were removed at definite points. A 100 mg amount of each sample was weighed and dissolved in 10 ml of super-pure water. A 10 μl amount of the obtained solution was subjected to liquid chromatography (column: cation exchange resin, flow rate: 0.8 ml/min) to thereby determine its erythritan content. Thus the purity of erythritol was calculated and the heat stability was evaluated. The erythritol purity was calculated based on the ratio among areas corresponding to the components in the liquid chromatogram. FIG. 4 shows the results.

EXAMPLE 3

The procedure of Example 2 was repeated, except that 18.3 g of erythritol was used (manufactured by Mitsubishi-Kagaku Foods Corporation) (molar ratio of $O_2$/erythritol= $8.4\times10^{-5}$). FIG. 4 shows the results.

Comparative Example 2

The procedure of Example 2 was repeated, except that 10 g of erythritol (manufactured by Mitsubishi-Kagaku Foods Corporation) (molar ratio of $O_2$/erythritol=$7.7\times10^{-4}$) was used. FIG. 4 shows the results.

EXAMPLE 4

The procedure of Example 1 was repeated, except that a mixture of 79.2 g of erythritol (manufactured by Mitsubishi-Kagaku Foods Corporation) with 0.08 g of 2-ethyl-4-methylimidazole was used. The results obtained are comparable to those obtained in Example 1.

According to the present invention, deterioration of a heat storage material can be prevented, even though it is heated at a high temperature for a long time. Thus, the present heat storage material can be used over a prolonged period of time and easily maintained, when employed in an electric water heating appliance of the closed system type.

Obviously, numerous modifications and variations of the present invention are possible in light of the above teachings. It is therefore to be understood that within the scope of the appended claims, the invention may be practiced otherwise than as specifically described herein.

What is claimed as new and is to be secured by Letters Patent:

1. A method of effecting heat storage/heat radiation, which comprises:

conducting heat storage/heat radiation in an apparatus equipped with a heat storage material of a sugar alcohol in a sealable container containing an atmosphere having an oxygen content of less than 20% by volume.

2. The method as claimed in claim 1, wherein said heat storage material fills a sealable container.

3. The method as claimed in claim 2, wherein the ratio of oxygen/sugar alcohol in said sealable container is not more than $5 \times 10^{-4}$ on a molar basis.

4. The method as claimed in claim 1, wherein said heat storage material is under an oxygen free atmosphere.

5. The method as claimed in claim 1, wherein said heat storage material is present in the container in vacuo.

6. The method as claimed in claim 1, wherein said heat storage material is present in the container together with from 0.01 to 10 parts by weight of an oxygen scavenger per 100 parts by weight of the sugar alcohol.

7. The method as claimed in claim 1, wherein said heat storage material comprises a sugar alcohol and from 0.005–10 parts by weight of a heterocyclic compound having nitrogen atom(s) per 100 parts by weight of the sugar alcohol.

8. The method as claimed in claim 1, wherein said sugar alcohol is erythritol.

9. The method as claimed in claim 7, wherein said heterocyclic compound having nitrogen atom(s) is a diazine, diazole, thiazole, pyridine or pyrrole.

10. The method as claimed in claim 9, wherein said diazole is an imidazole.

11. The method as claimed in claim 9, wherein said heterocyclic compound having nitrogen atom(s) is 2-ethyl-4-methylimidazole or 1-benzyl-2-methylimidazole.

12. The method as claimed in claim 9, wherein said heterocyclic compound having nitrogen atom(s) is present in an amount of from 0.005 to 10 parts by weight per 100 parts by weight of said sugar alcohol.

13. The method as claimed in claim 1, wherein said heat storage material comprises a sugar alcohol heated to 90–100° C. at which temperature the sugar alcohol is melted.

14. The method as claimed in claim 1, wherein said oxygen content is not more than 10% by volume.

15. The method as claimed in claim 1, wherein said heat storage material further contains an inorganic or organic salt selected from the group consisting of phosphates, sulfates, pyrophosphates, carbonates, calcium salts of inorganic acids, silver halides and polyvalent metal salts of long-chain fatty acids, which is barely soluble in water.

* * * * *